United States Patent
Doddaiah et al.

(10) Patent No.: US 11,599,441 B2
(45) Date of Patent: Mar. 7, 2023

(54) THROTTLING PROCESSING THREADS

(71) Applicant: EMC IP Holding Company LLC, Hopkinton, MA (US)

(72) Inventors: Ramesh Doddaiah, Westborough, MA (US); Malak Alshawabkeh, Franklin, MA (US); Mohammed Asher, Bangalore (IN); Rong Yu, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 387 days.

(21) Appl. No.: 16/838,079

(22) Filed: Apr. 2, 2020

(65) Prior Publication Data
US 2021/0311852 A1    Oct. 7, 2021

(51) Int. Cl.
*G06F 11/00*    (2006.01)
*G06F 11/34*    (2006.01)
*G06N 20/00*    (2019.01)
*G06F 9/50*    (2006.01)

(52) U.S. Cl.
CPC .......... *G06F 11/3433* (2013.01); *G06F 9/505* (2013.01); *G06F 11/3476* (2013.01); *G06F 11/3485* (2013.01); *G06N 20/00* (2019.01)

(58) Field of Classification Search
CPC .. G06F 11/3433; G06F 9/505; G06F 11/3485; G06F 11/3006; G06F 11/3034
See application file for complete search history.

(56) References Cited

U.S. PATENT DOCUMENTS

| | | | | |
|---|---|---|---|---|
| 2002/0046230 A1* | 4/2002 | Dieterich | ............. | G06F 9/4843 718/107 |
| 2005/0050305 A1* | 3/2005 | Kissell | ................. | G06F 9/4881 712/E9.032 |
| 2013/0086235 A1* | 4/2013 | Ferris | ..................... | G06F 9/505 709/223 |

* cited by examiner

*Primary Examiner* — Amine Riad
(74) *Attorney, Agent, or Firm* — Krishnendu Gupta; Nikhil Patel

(57) ABSTRACT

Embodiments of the present disclosure relate to throttling processing threads of a storage device. One or more input/output (I/O) workloads of a storage device can be monitored. One or more resources consumed by each thread of each storage device component to process each operation included in a workload can be analyzed. Based on the analysis, consumption of each resource consumed by each thread can be controlled.

20 Claims, 4 Drawing Sheets

400

THROTTLING PROCESSING THREADS

BACKGROUND

Many organizations implement shared infrastructures to increase operational efficiencies and improve resource utilization. In response to users, applications, and/or devices requesting access to the same infrastructure resource, quality of service (QoS) technologies can be used to manage the requests. QoS technologies can include policies that attempt to ensure expected performance levels of the shared infrastructure. For example, QoS policies can be used to ensure that business-critical applications are provided consistent and expected performance by the shared infrastructure.

SUMMARY

One or more aspects of the present disclosure relate to throttling processing threads of a storage device. One or more input/output (I/O) workloads of a storage device can be monitored. One or more resources consumed by each thread of each storage device component to process each operation included in a workload can be analyzed. Based on the analysis, consumption of each resource consumed by each thread can be controlled In embodiments, each I/O workloads for each storage device can be analyzed to identify workload patterns of each storage device. Further, I/O workload characteristics corresponding to one or more anticipated workloads for each storage device can be predicted based on the identified patterns.

In embodiments, the analysis of each thread's resource consumption can be stored in global memory.

In embodiments, I/O workload processing of each storage device component can be analyzed. In addition, I/O workload characteristics corresponding to one or more anticipated workloads for each storage device component can be predicted. Further, the analysis and the predictions can be stored in the global memory.

In embodiments, the one or more resources consumed each storage device component thread can be analyzed based on the analyzed storage device component workload processing. Resource consumption for each component's threads can also be predicted based on the analyzed resource consumption of each thread. Further, the analyzed resource consumption of each thread and the predicted resource consumption for each component's threads can be stored in the global memory.

In embodiments, one or more resource consumption policies can be generated for each component's thread based on each thread's predicted resource consumption.

In embodiments, the one or more resource consumption policies can be generated based further on one or more of each analyzed workload, predicted workload, analyzed resource consumptions, predicted resource consumptions for each component of a subject storage device.

In embodiments, information including each analyzed workload, predicted workload, analyzed resource consumptions, and predicted resource consumptions can be retrieved for each component of each storage device of one or more storage device clusters in a storage area network (SAN). Additionally, the one or more resource consumption policies can be generated based further on the retrieved information.

In embodiments, the one or more resource consumption policies can be generated using one or more machine learning (ML) engines. The one or more ML engines can include an on-policy reinforcement learning engine.

In embodiments, one or more random resource consumption policies can be generated. Additionally, the one or more random resource consumption policies can be executed. One or more current resource consumption policies can be optimized based on analyzed results of the executed resource consumption policies using the one or more ML engines.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A storage device such as a storage array provided over a storage array network (SAN) can receive input/output (I/O) workloads that include I/O operations from different hosts and/or applications. In response to receiving the workloads, the storage device can include one or more components (e.g., hardware and/or software elements) that process each I/O operation by executing one or more threads (e.g., a sequence of instructions). Organizations often use quality of service (QoS) technologies to limit and/or prevent each host and/or application from disrupting each other's storage performance levels received from the storage device. For example, organizations often desire storage devices to deliver consistent storage performance to business-critical applications. To meet desired storage performance, the QoS technologies can control access to storage device resources between hosts and/or applications to prevent such disruption.

Organizations currently use QoS technologies such as rate limiting, prioritization, and tiering. However, these technologies are known to fail when storage requirements scale (e.g., when there are many hosts and/or applications requesting access to storage device resources). When organizations' storage requirements scale, they generally implement host-based QoS technologies. Host-based QoS technologies are configured to control shared storage resources based on metrics such as input/output (I/O) operations per second (IOPS) and response times. However, those metrics do not provide information related to, e.g., a storage device's hardware and/or software resources ("component resources") required to implement shared storage services. The hardware resources can include, e.g., a central processing unit (CPU), memory, hardware bandwidth, and fabric bandwidth, amongst others. The software (e.g., feature) resources can include, e.g., software bandwidth, local replication, remote replication, prefetch, asynchronous I/O, scrubber, low priority tasks, I/O processing, protocol processing (e.g., FC, NVME, ISCSI), firmware, and drivers, amongst others. Thus, the current host-based QoS techniques cannot control how the component resources are consumed.

Embodiments of the present disclosure relate to novel QoS technologies applied to the component resources. For example, the embodiments can identify threads that are not related to a current I/O workload, e.g., low priority tasks, features, and scrubbers (herein referred to as "out-of-context threads"). The novel QoS technologies can limit each out-of-context thread's access to the component resources. Thus, the embodiments can advantageously increase an amount of component resources available to process current I/O workloads.

Figure 1:
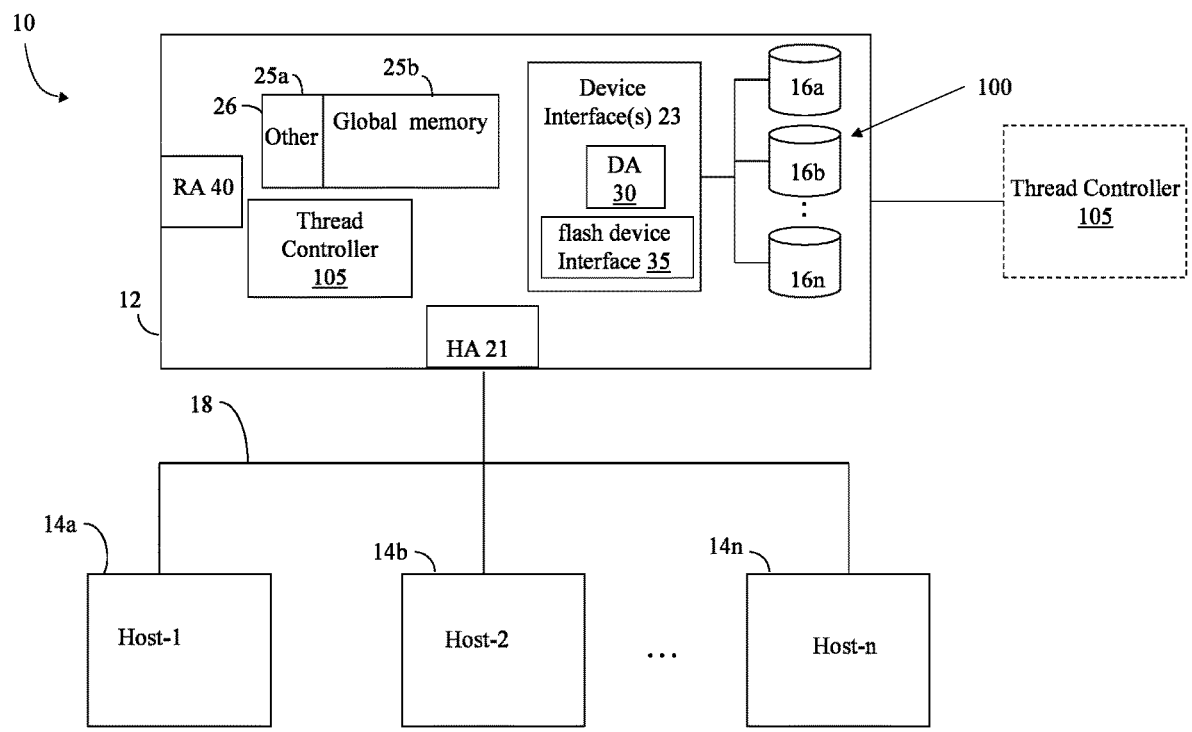
FIG. 1 is a block diagram of a storage system in accordance with example embodiments disclosed herein.

Referring to FIG. 1, an example system 10 includes a data storage device 12. The device 12 is connected to host systems 14a-n through communication medium 18. In embodiments, the hosts 14a-n can access the data storage device 12, for example, to perform input/output (I/O) operations or data requests. The communication medium 18 can be any one or more of a variety of networks or other type of communication connections as known to those skilled in the art. In embodiments, the communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-n can access and communicate with the data storage device 12 such as. The hosts 14a-n can also communicate with other components included in the system 10 via the communication medium 18. In embodiments, each of the hosts 14a-n can access the storage device 12 via, e.g., a SAN switch (not shown). In embodiments, the SAN switch can be a Fibre Channel (FC) switch employing an FC communication protocol. The FC switch can examine data packet headers of I/O operations or data requests, determine their respective origin and destination, and send the packets to a correct host adapter (HA) 21 of the storage device 12.

Each of the hosts 14a-n and the data storage device 12 can be connected to the communication medium 18 by any one of a variety of connections as may be provided and supported in accordance with the type of communication medium 18. The processors included in the hosts 14a-n and/or storage device 12 may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage device 12 are described herein in more detail and can vary with each embodiment. Each of the hosts 14a-n and data storage device 12 can all be located at the same physical site or can be in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and data storage device 12 can be connected to the communication medium may pass through other communication devices, such as switching equipment that may exist, e.g., a phone line, a repeater, a multiplexer or even a satellite.

Each of the hosts 14a-n can perform different types of data operations in accordance with different types of tasks. In embodiments, any one of the hosts 14a-n may issue a data request (e.g., including an input/output (I/O) operation) to the data storage device 12 to perform a data operation. For example, an application executing on one of the hosts 14a-n can issue an I/O operation (e.g., a read or write operation) via one or more data requests to the data storage device 12.

It should be noted that although device 12 is illustrated as a single data storage system, such as a single data storage array, device 12 may also represent, for example, multiple data storage arrays alone, or in combination with, other data storage devices, systems, appliances, and/or components having suitable connectivity, such as in a SAN. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage device 12 can include a plurality of data storage devices 16a-n. The data storage devices 16a-n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-n and the global memory (GM) 25b. In an embodiment, the HA 21 may be a Fibre Channel Adapter (FA) or another adapter which facilitates host communication. The HA 21 may be characterized as a front-end component of the data storage device 12 which receives a request from one or more of the hosts 14a-n. The data storage array 12 can include one or more RAs (e.g., RA 40) that may be used, for example, to facilitate communications between data storage arrays (e.g., between the storage array 12 and the external storage device(s) 105). The data storage array 12 may also include one or more device interfaces 23 for facilitating data transfers to/from the data storage devices 16a-n. The data storage interfaces 23 may include device interface modules, for example, one or more disk adapters (DAs) 30 (e.g., disk controllers), flash drive interface 35, and the like. The DA 30 can be characterized as a back-end component of the data storage device 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-n provide data and access control information through channels to the storage systems 12, and the storage systems 12 may also provide data to the host systems 14a-n also through the channels. The host systems 14a-n do not address the drives or devices 16a-n of the storage systems directly, but rather access to data can be provided to one or more host systems 14a-n from what the host systems view as a plurality of logical devices or logical volumes (LVs). The LVs may or may not correspond to the actual physical devices or drives 16a-n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two or more data storage arrays (e.g., device 12 and external device(s) 105). The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-n. For example, a device interface may be a DA 30 that accomplishes the foregoing by creating job records for the different LVs associated with a device. These different job records may be associated with the different LVs in a data structure stored and managed by each device interface.

The storage device 12 can include a thread controller 105 that can monitor workloads received by the storage device 12. For example, the controller 105 can access, e.g., one or more storage device system logs to determine queue depth counts associated with each thread required to process the workloads. Using the identified queues and their corresponding queue depth counts, the controller 105 can determine characteristics of any received workload. The characteristics of a workload can include number, type (e.g., read or write), and size of each I/O request (e.g., operation) within a workload. Further, the controller 105 can access the system logs to determine metrics associated with one or more storage device hardware and/or software resources. Using the workload characteristics and the hardware and/or software metrics, the controller 105 can identify out-of-context threads, jobs and work (collectively referred to herein as "tasks") consuming the storage device's hardware and/or software resources. The controller 105 can throttle the identified out-of-context tasks to ensure each I/O operation within a current workload has access to at least a minimum amount of required storage device resources. For example, the amount of storage device resources can be an amount required to satisfy a service level agreement (SLA) between an organization and storage service provider (e.g., vendor).

Although the thread controller 105 is depicted within the device 12, it should be noted that the thread controller 105 may exist external to the data storage device 12 (as illustrated). Accordingly, the controller 105 can communicate with the data storage device 12 using any one of a variety of communication connections. In one embodiment, the thread controller 105 may communicate with the data storage device 12 through connections including one or more of a serial port, a parallel port and a network interface card, e.g., with an Ethernet connection. Using the Ethernet connection, for example, the thread controller 105 may communicate directly with DA 30 and HA 21 within the data storage device 12.

Figure 2:
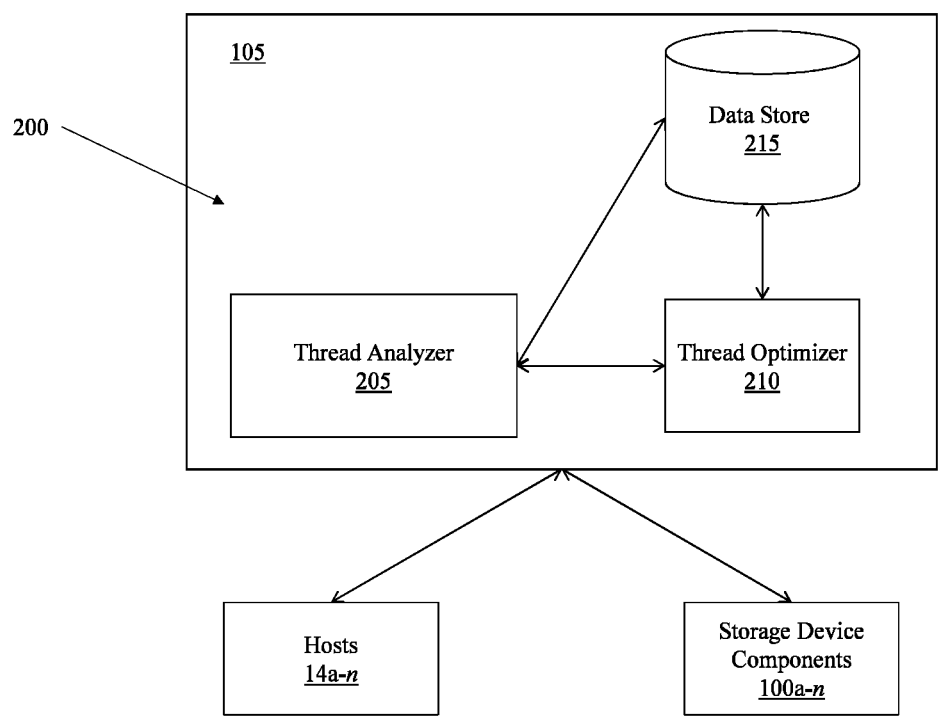
FIG. 2 is a block diagram of a thread controller in accordance with example embodiments disclosed herein.

Referring to FIG. 2, a thread controller 105 can include elements 200 (e.g., software and hardware elements). It should be noted that the thread controller 105 may be any one of a variety of commercially available processors, such as an Intel-based processor, a parallel processor such as a graphical processing unit (GPU), and the like. Although what is described herein shows the elements 100 residing in the thread controller 105, all or portions of the illustrated elements 200 may also reside in one or more of the other elements 100 such as, for example, in HA 21, or any of the host systems 14a-n of FIG. 1.

In embodiments, the thread controller can be communicatively coupled to storage device components 100a-n (e.g., components 16a-n, 21-23, 25a-b, 26, 30, 35, and 40, amongst other known components of FIG. 1) via, e.g., a Fibre channel (FC). Each component 100a-n can execute one or more threads based on, e.g., a schedule, a current workload, and/or an anticipated workload.

The thread controller 105 can include a thread analyzer 205 that collects data from the components 100a-n. For example, the components 100a-n of the storage device 12 of FIG. 1 can include one or more daemons (not shown) communicatively coupled to and configured to monitor the components 100a-n. The daemons can generate log files that record activity data of components 100a-n. Accordingly, the analyzer 205 can collect the data via one or more communication push and/or pull techniques to retrieve the log files generated by each daemon.

The analyzer 205 can store the data in data store 215. In embodiments, the collected data can include real-time and/or historical component parameters, configuration information, and telemetry data. For example, the collected data can include workload information, I/O types (e.g., read/write percentages), I/O sizes, SLs associated with each I/O, activity types, performance (e.g., response times), cache hit rates, required hardware resources, and resource consumption metrics, amongst other storage device component data.

Using the data, the analyzer 205 can determine the characteristics of any I/O workload. The characteristics of a workload can include number, type (e.g., read or write), and size of each I/O request (e.g., operation) within a workload. For example, the analyzer 205 can determine queue depth counts of each I/O queue and their corresponding thread(s). Each storage queue can include metadata corresponding to I/O operation characteristics each queue can respectively buffer. Thus, the analyzer 205 can determine workload characteristics based on metadata from queues that have increased in size in response to a received workload. In response to determining a workload characteristic, the analyzer 205 can generate a searchable workload data structure that associates a unique workload identifier of a workload with characteristics of the workload. The analyzer 205 can generate the unique workload identifier using, e.g., any known generator (e.g., a random number generator). The analyzer 205 can search the workload data structure in response to receiving a workload to determine if the workload has previously been characterized. If a workload has not been characterized, the analyzer 205 can characterize the workload and update the searchable data structure.

By identifying the queues that have increased in size, the analyzer 205 can also identify the threads required to process the received workload. Accordingly, the analyzer 205 can flag unidentified threads as out-of-context threads. For example, the analyzer 205 can access a table of threads and their corresponding queues from the data store 215. The table can include fields that allow the analyzer 205 to flag a thread as being either an out-of-context thread or workload related.

Generally, each thread can include a scheduler (or pie) count that controls the execution of each thread and, thus each thread's consumption of component resources. Because current QoS technologies do not include policies for dynamically adjusting scheduler (or pie) counts, they allow out-of-context threads to consume component resources while their respective pie counts are positive. Accordingly, current QoS policies can inadvertently allow the disruption of storage device performances for current workloads.

In embodiments, the thread controller 105 can include a thread optimizer 210 configured to dynamically adjust thread pie counts to prevent such disruption. Using the determined workload characteristics, the optimizer 210 can dynamically generate storage array policies using queue depth counts and storage device telemetry data from, e.g., the daemons. The telemetry data can include any known storage device metrics such as those related to performance. In response to determining a current workload's characteristics, the optimizer 210 can identify a storage array policy for processing the current workload. The policy can include rules for throttling threads, jobs, and work to ensure there are enough component resources to satisfy SLAs associated with I/O operations of the current workload. In embodiments, the optimizer 210 can generate each storage array policy with a unique policy identifier. The unique policy identifier can be, e.g., a hash the optimizer 210 generates from the unique workload identifier. The optimizer 210 can map the unique policy identifier to its corresponding unique workload identifier using a searchable policy data structure. In response to receiving a workload, the optimizer 210 can search the policy data structure to determine if a policy for processing the workload has previously been generated. If a policy has not been generated, the optimizer 210 can generate a policy as described in greater detail herein.

In embodiments, the optimizer 210 can generate a storage array policy for processing any given workload based on, e.g., score for each thread. Each thread score can define each thread's priority relative to other threads for any given workload. Further, each thread can have a unique thread score per workload characteristic that identifies each thread's relative priority per workload. Using the thread scores, the optimizer 210 can generate a storage array policy that sets resource thresholds per thread. Accordingly, the optimizer 210 can throttle resource access to those threads having the lowest range of relative priorities and increase resource access to those threads with the highest range of relative priorities.

Further, the optimizer 210 can include a machine learning (ML) engine (not shown) that can analyze a performance of the storage device 12 in response to processing a workload with a storage array policy. Based on the analysis, the ML engine can classify a quality of the policy. For example, the ML engine can classify a policy with a positive indicator should the analyzed performance of the storage device 12 meet an organization's SLA. If the policy does not result in the storage device meeting the organization's SLA, the ML engine can classify the policy negatively. The ML engine can use one or more on-policy reinforcement learning techniques to optimize generation new policies and/or optimize existing policies.

In embodiments, the optimizer 210 can generate a score for each thread based on the analysis performed by the ML engine. For example, the optimizer 210 can produce a table that lists each thread and their respective component consumption levels for any given workload characteristic. The table can provide component consumption levels of, e.g., CPU, memory, and bandwidth resources, amongst other known component resources. The ML engine can implement policies that test different combinations of thread throttling to identify a combination that improves the performance of the storage device. For example, the ML engine can identify those combinations that improve IOPS and reduces response time (RT) of the storage device 12. For those policies with such a combination, the optimizer 210 can generate a score for each thread based on factors including one or more of identifying throttled threads, throttle percentages, and relative pie or scheduler counts.

In other embodiments, the optimizer 210 can generate a score for each thread of each component 100a-n by building an N-number of thread clusters, where 'N' is a hyperparameter. For instance, the optimizer 210 for, e.g., CPU cycle consumption, can build an N-number of thread clusters for each core. Based on the performance analysis discussed above, the optimizer 210 can identify those threads on each CPU core that have a high relative importance during peak workloads. For example, the optimizer can identify those threads as having high relative importance if their component consumption levels are greater than an initial consumption threshold. As such, the optimizer 210 can designate threads as having a low relative importance that have consumption levels below the threshold during such during peak workloads. In response to identifying the relatively low importance threads, the optimizer 210 can lower their respective pie or scheduler counts, which in turn throttles their consumption of component resources as described herein. Further, the ML engine can redefine the threshold level to test different throttling scenarios. In response to measuring the IOPS and RT of the storage device 12, the ML engine can generate scores for each thread. As such, the ML engine can continue redefining the threshold unit it identifies a cluster throttling policy that yields the greatest rewards (e.g., with respect to IOPS and RT metrics of the storage device 12).

In embodiments, the optimizer 210 can store each generated policy in global memory 25b of FIG. 1. Further, the optimizer can generate a decision tree for each policy and store them in local memory (e.g., memory 215) and in global shared memory. The decision three can include non-terminating and terminating nodes. Non-terminating nodes can define one or more components 100a-n or feature, include indicators such as weights, ranges, or discrete values, which identify each component's or feature's importance. The importance can be represented as a relative percentage or discrete amount. Each terminating node can include instructions for generating a policy. Accordingly, the ML engine can traverse a tree to a terminating node based on analysis of a received workload and the workload processing performance of the storage device 12.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 3:
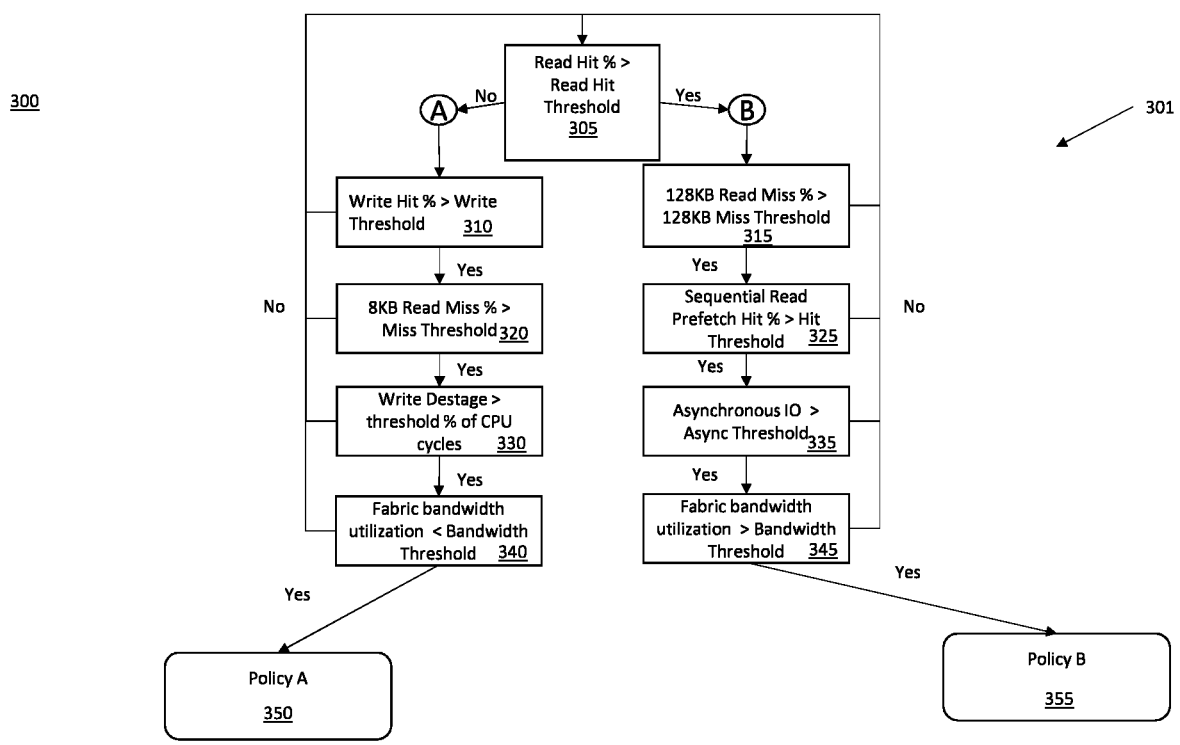
FIG. 3 illustrates a decision tree flow diagram of a method for throttling threads of a storage device in accordance with example embodiments disclosed herein.

Referring to FIG. 3, a method 300 implemented as a decision tree 301 can be executed by the throttling controller 105 of FIG. 1. The tree 301 includes nodes 305-355. Node 305 is a root node, and nodes 350-355 are terminating nodes. The nodes 310-345 between the root node 305 and terminating nodes 350-355 are non-terminating nodes.

In response to receiving and processing a workload by the storage device 12, the method 300, at node 305, can determine whether a read hit percent (%) level is greater than a read hit threshold. For a negative determination, the method 300 continues to follow branch A of the tree 301. For a positive determination, the method 300 continues to follow branch B of the tree 301. For each non-terminating node 310-345, if a negative determination is made, the method 300 can include terminating traversal of the tree 301 and restart traversal of the tree at root node 305.

In response to determining to traverse branch A, the method 300, at node 310, can include determining if a write hit % is greater than a write % threshold. If positive, at node 320, the method 300, can include determining if an 8k I/O read miss % is greater than an 8k read miss % threshold. The method 300 continues to node 330 in response to a positive result by node 320. At node 330, the method 300 can include determining if a write destage % is greater than a CPU cycle % threshold. If positive, the method 300, at node 340, can include determining if a fabric bandwidth % utilization is less than a bandwidth % threshold. The method 300, at terminating node 350, can include generating policy A if node 340 returns a positive result. In embodiments, policy A can include rules for changing fabric and scrubber thread affinities from open to fixed, opening an affinity for write pyramid threads to get greater CPU cycles, and throttling fabric, scan and low priority threads. In embodiments, a fixed thread affinity relates to an operating system scheduler configured to fix a thread to given CPU core. Additionally, an open thread affinity relates to a scheduler configured to enable a thread to run on set of predefined CPU cores.

In response to determining to traverse branch B, the method 300, at node 315, can include determining if a 128k read miss % is greater than a read miss % threshold. If positive, at node 325, the method 300, can include determining if a sequential read prefetch hit % is greater than a sequential read prefetch hit % threshold. The method 300 continues to node 335 in response to a positive result by node 325. At node 335, the method 300 can include determining if an asynchrous I/O % is greater than an asynchrous % threshold. If positive, the method 300, at node 345, can include determining if a fabric bandwidth % utilization is greater than the bandwidth % threshold. The method 300, at terminating node 355, can include generating policy B if node 345 returns a positive result. In embodiments, policy B can include rules for throttling asynchronous I/O threads, sequential read prefetch threads, scan threads, low priority thread, and opening write pyramid thread affinities to obtain access to greater CPU cycles.

It should be noted that the method 300 and decision tree 301 is a non-limiting example of a method for traversing a storage array policy generated as a decision tree data structure.

It should be further noted that each step of the method 300 can include any combination of techniques implemented by the embodiments described herein.

Figure 4:
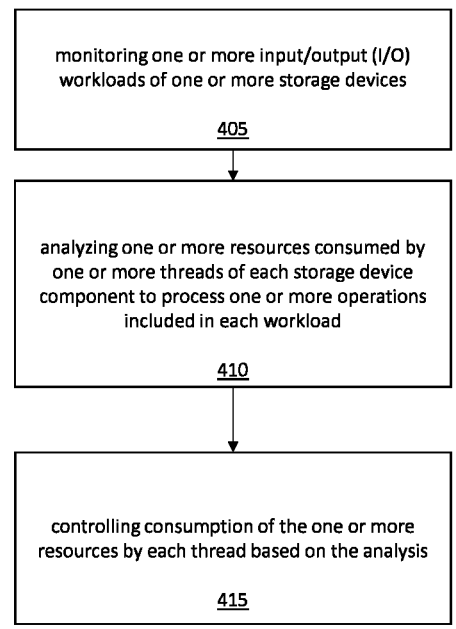
FIG. 4 is another flow diagram of a method for throttling threads of a storage device in accordance with example embodiments disclosed herein.

Referring to FIG. 4, a method 400 can be executed by, e.g., the throttling controller 105 of FIG. 1. The method 400 describes steps for throttling threads of, e.g., the storage device 12 of FIG. 1. At 405, the method 400 can include monitoring one or more input/output (I/O) workloads of one or more storage devices. The method 400, at 410, can also include analyzing one or more resources consumed by one or more threads of each storage device component to process one or more operations included in each workload. At 415, the method 400 can include controlling consumption of the one or more resources by each thread based on the analysis.

It should be noted that each step of the method 400 can include any combination of techniques implemented by the embodiments described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   monitor one or more input/output (I/O) workloads of one or more storage devices;
   analyze one or more resources consumed by one or more threads of each storage device component to process one or more operations included in each workload;
   control consumption of the one or more resources by each thread based on the analysis, wherein controlling resource consumption includes limiting one or more out-of-context threads from accessing the one or more resources.

2. The apparatus of claim 1 further configured to:
   analyze the one or more I/O workloads for each storage device to identify workload patterns of each storage device; and
   predict I/O workload characteristics corresponding to one or more anticipated workloads for each storage device based on the identified patterns.

3. The apparatus of claim 2 further configured to store the analysis each thread's resource consumption in global memory.

4. The apparatus of claim 3 further configured to:
   analyze I/O workload processing of each storage device component;
   predict I/O workload characteristics corresponding to one or more anticipated workloads for each storage device component; and
   store the analysis and the predictions in the global memory.

5. The apparatus of claim 4 further configured to:
   analyze the one or more resources consumed each storage device component thread based on the analyzed storage device component workload processing;

predict resource consumption for each component's threads based on the analyzed resource consumption of each thread; and store the analyzed resource consumption of each thread and the predicted resource consumption for each component's threads in the global memory.

6. The apparatus of claim 5 further configured to generate one or more resource consumption policies for each component's thread based on each thread's predicted resource consumption.

7. The apparatus of claim 6 further configured to generate the one or more resource consumption policies based further on one or more of each analyzed workload, predicted workload, analyzed resource consumptions, predicted resource consumptions for each component of a subject storage device.

8. The apparatus of claim 6 further configured to:
retrieve information including each analyzed workload, predicted workload, analyzed resource consumptions, and predicted resource consumptions for each component of each storage device of one or more storage device clusters in a storage area network (SAN); and
generate the one or more resource consumption policies based further on the retrieved information.

9. The apparatus of claim 8 further configured to generate the one or more resource consumption policies using one or more machine learning (ML) engines, the one or more ML engines including on-policy reinforcement learning.

10. The apparatus of claim 9 further configured to:
generate one or more random resource consumption policies;
execute the one or more random resource consumption policies; and
optimize one or more current resource consumption policies based on analyzed results of the executed resource consumption policies using the one or more ML engines.

11. A method comprising:
monitoring one or more input/output (I/O) workloads of one or more storage devices;
analyzing one or more resources consumed by one or more threads of each storage device component to process one or more operations included in each workload; and
controlling consumption of the one or more resources by each thread based on the analysis, wherein controlling resource consumption includes limiting one or more out-of-context threads from accessing the one or more resources.

12. The method of claim 11 further comprising:
analyzing the one or more I/O workloads for each storage device to identify workload patterns of each storage device; and
predicting I/O workload characteristics corresponding to one or more anticipated workloads for each storage device based on the identified patterns.

13. The method of claim 12 further comprising storing the analysis of each thread's resource consumption in global memory.

14. The method of claim 13 further comprising:
analyzing I/O workload processing of each storage device component;
predicting I/O workload characteristics corresponding to one or more anticipated workloads for each storage device component; and
storing the analysis and the predictions in the global memory.

15. The method of claim 14 further comprising:
analyzing the one or more resources consumed each storage device component thread based on the analyzed storage device component workload processing;
predicting resource consumption for each component's threads based on the analyzed resource consumption of each thread; and
storing the analyzed resource consumption of each thread and the predicted resource consumption for each component's threads in the global memory.

16. The method of claim 15 further comprising generating one or more resource consumption policies for each component's thread based on each thread's predicted resource consumption.

17. The method of claim 16 further comprising generating the one or more resource consumption policies based further on one or more of each analyzed workload, predicted workload, analyzed resource consumptions, predicted resource consumptions for each component of a subject storage device.

18. The method of claim 16 further comprising:
retrieving information including each analyzed workload, predicted workload, analyzed resource consumptions, and predicted resource consumptions for each component of each storage device of one or more storage device clusters in a storage area network (SAN); and
generating the one or more resource consumption policies based further on the retrieved information.

19. The method of claim 18 further comprising generating the one or more resource consumption policies using one or more machine learning (ML) engines, the one or more including on-policy reinforcement learning.

20. The method of claim 19 further comprising:
generating one or more random resource consumption policies;
executing the one or more random resource consumption policies; and
optimizing one or more current resource consumption policies based on analyzed results of the executed resource consumption policies using the one or more ML engines.

* * * * *